(12) United States Patent
Wong et al.

(10) Patent No.: US 10,921,528 B2
(45) Date of Patent: Feb. 16, 2021

(54) DUAL SPRING MULTI-FIBER OPTIC CONNECTOR

(71) Applicant: Senko Advanced Components Inc, Marlborough, MA (US)

(72) Inventors: Yim Wong, Kowloon (HK); Man Kit Wong, Kowloon (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/407,603

(22) Filed: May 9, 2019

(65) Prior Publication Data
US 2019/0377138 A1 Dec. 12, 2019

Related U.S. Application Data

(60) Provisional application No. 62/682,012, filed on Jun. 7, 2018.

(51) Int. Cl.
*G02B 6/38* (2006.01)

(52) U.S. Cl.
CPC .......... *G02B 6/3847* (2013.01); *G02B 6/3825* (2013.01)

(58) Field of Classification Search
CPC ............................ G02B 6/3847; G02B 6/3825
See application file for complete search history.

(56) References Cited

U.S. PATENT DOCUMENTS

| | | |
|---|---|---|
| 3,721,945 A | 3/1973 | Hults |
| 4,150,790 A | 4/1979 | Potter |
| 4,327,964 A | 5/1982 | Haesly |
| 4,478,473 A | 10/1984 | Frear |
| 4,762,388 A | 8/1988 | Tanaka |
| 4,764,129 A | 8/1988 | Jones |
| 4,840,451 A | 6/1989 | Sampson |
| 4,844,570 A | 7/1989 | Tanabe |
| 4,872,736 A | 10/1989 | Myers |
| 4,979,792 A | 12/1990 | Weber |
| 5,041,025 A | 8/1991 | Haitmanek |
| 5,074,637 A | 12/1991 | Rink |
| D323,143 S | 1/1992 | Ohkura |
| 5,212,752 A | 5/1993 | Stephenson |
| 5,265,181 A | 11/1993 | Chang |
| 5,280,552 A | 1/1994 | Yokoi |
| 5,289,554 A | 2/1994 | Cubukciyan |
| 5,317,663 A | 5/1994 | Beard |
| 5,335,301 A | 8/1994 | Newman |
| 5,348,487 A | 9/1994 | Marazzi |
| 5,444,806 A | 8/1995 | de Marchi |
| 5,481,634 A | 1/1996 | Anderson |
| 5,506,922 A | 4/1996 | Grois |

(Continued)

FOREIGN PATENT DOCUMENTS

| | | |
|---|---|---|
| CA | 2495693 A1 | 4/2004 |
| CN | 2836038 Y | 11/2006 |

(Continued)

*Primary Examiner* — Chris H Chu
(74) *Attorney, Agent, or Firm* — Edward S. Jarmolowicz, Esq.

(57) ABSTRACT

A fiber optic connector having a set of opposing pins set in a recess configured to accept a corresponding spring therein. The springs are placed on either side of the fiber optic cable bundle and secured within pinkeep. The dual or outer springs help prevent rotation of the ferrule assembly during use.

7 Claims, 11 Drawing Sheets

(56) References Cited

U.S. PATENT DOCUMENTS

| | | |
|---|---|---|
| 5,521,997 A | 5/1996 | Rovenolt |
| 5,570,445 A | 10/1996 | Chou |
| 5,588,079 A | 12/1996 | Tanabe |
| 5,664,039 A * | 9/1997 | Grinderslev ......... G02B 6/3684 385/59 |
| 5,684,903 A | 11/1997 | Kyomasu |
| 5,687,268 A | 11/1997 | Stephenson |
| 5,781,681 A | 7/1998 | Manning |
| 5,915,056 A | 6/1999 | Bradley |
| 5,937,130 A | 8/1999 | Amberg |
| 5,956,444 A | 9/1999 | Duda |
| 5,971,626 A | 10/1999 | Knodell |
| 6,007,256 A * | 12/1999 | Asada ................ G02B 6/3887 385/59 |
| 6,041,155 A | 3/2000 | Anderson |
| 6,049,040 A | 4/2000 | Biles |
| 6,134,370 A | 10/2000 | Childers |
| 6,178,283 B1 | 1/2001 | Weigel |
| 6,186,670 B1 | 2/2001 | Austin |
| RE37,080 E | 3/2001 | Stephenson |
| 6,206,577 B1 | 3/2001 | Hall |
| 6,206,581 B1 | 3/2001 | Driscoll |
| 6,227,717 B1 | 5/2001 | Ott |
| 6,238,104 B1 | 5/2001 | Yamakawa |
| 6,247,849 B1 | 6/2001 | Liu |
| 6,347,888 B1 | 2/2002 | Puetz |
| 6,352,373 B1 * | 3/2002 | Yamaguchi .......... G02B 6/3869 385/60 |
| 6,461,054 B1 | 10/2002 | Iwase |
| 6,471,412 B1 | 10/2002 | Belenkiy |
| 6,478,472 B1 | 11/2002 | Anderson |
| 6,530,696 B1 | 3/2003 | Ueda |
| 6,551,117 B2 | 4/2003 | Poplawski |
| 6,579,014 B2 | 6/2003 | Melton |
| 6,634,801 B1 | 10/2003 | Waldron |
| 6,648,520 B2 | 11/2003 | McDonald |
| 6,682,228 B2 | 1/2004 | Rathnam |
| 6,685,362 B2 | 2/2004 | Burkholder |
| 6,695,486 B1 | 2/2004 | Falkenberg |
| 6,785,460 B2 | 8/2004 | de Jong |
| 6,817,780 B2 | 11/2004 | Ngo |
| 6,854,894 B1 | 2/2005 | Yunker |
| 6,872,039 B2 | 3/2005 | Baus |
| 6,935,789 B2 | 8/2005 | Gross |
| 7,020,376 B1 | 3/2006 | Dang |
| 7,036,993 B2 | 5/2006 | Luther |
| 7,077,576 B2 | 7/2006 | Luther |
| 7,090,406 B2 | 8/2006 | Melton |
| 7,090,407 B2 | 8/2006 | Melton |
| 7,091,421 B2 | 8/2006 | Kukita |
| 7,111,990 B2 | 9/2006 | Melton |
| 7,113,679 B2 | 9/2006 | Melton |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,207,724 B2 | 4/2007 | Gurreri |
| D543,146 S | 5/2007 | Chen |
| 7,241,956 B1 | 7/2007 | Stimpson |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien |
| 7,315,682 B1 | 1/2008 | En Lin |
| 7,325,976 B2 | 2/2008 | Gurreri |
| 7,325,980 B2 | 2/2008 | Pepe |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin |
| 7,431,604 B2 | 10/2008 | Waters |
| 7,463,803 B2 | 12/2008 | Cody |
| 7,465,180 B2 | 12/2008 | Kusuda |
| 7,510,335 B1 | 3/2009 | Su |
| 7,513,695 B1 | 4/2009 | Lin |
| 7,540,666 B2 | 6/2009 | Luther |
| 7,561,775 B2 | 7/2009 | Lin |
| 7,591,595 B2 | 9/2009 | Lu |
| 7,594,766 B1 | 9/2009 | Sasser |
| 7,641,398 B2 | 1/2010 | O'Riorden |
| 7,654,748 B2 | 2/2010 | Kuffel |
| 7,695,199 B2 | 4/2010 | Teo |
| 7,699,533 B2 | 4/2010 | Milette |
| 7,785,019 B2 | 8/2010 | Lewallen |
| 7,824,113 B2 | 11/2010 | Wong |
| 7,837,395 B2 | 11/2010 | Lin |
| D641,708 S | 7/2011 | Yamauchi |
| 8,186,890 B2 | 5/2012 | Lu |
| 8,192,091 B2 | 6/2012 | Hsu |
| 8,202,009 B2 | 6/2012 | Lin |
| 8,224,146 B2 | 7/2012 | Hackett |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,465,317 B2 | 6/2013 | Gniadek |
| 8,534,928 B2 | 9/2013 | Cooke |
| 8,556,520 B2 | 10/2013 | Elenbaas |
| 8,622,634 B2 | 1/2014 | Arnold |
| 8,636,424 B2 | 1/2014 | Kuffel |
| 8,636,425 B2 | 1/2014 | Nhep |
| 8,651,749 B2 | 2/2014 | Dainese |
| 8,678,670 B2 | 3/2014 | Takahashi |
| 8,770,863 B2 | 7/2014 | Cooke |
| 8,855,458 B2 | 10/2014 | Belenkiy |
| 9,239,437 B2 | 1/2016 | Belenkiy |
| 9,383,539 B2 | 7/2016 | Hill |
| 9,618,702 B2 | 4/2017 | Takano |
| 9,618,703 B2 | 4/2017 | Iizumi |
| 9,658,409 B2 | 5/2017 | Gniadek |
| 9,772,457 B2 | 9/2017 | Hill |
| 9,778,090 B2 | 10/2017 | Hirt |
| 9,778,425 B2 | 10/2017 | Nguyen |
| 9,798,090 B2 | 10/2017 | Takano |
| 9,798,094 B2 | 10/2017 | Kuffel |
| 9,933,582 B1 | 4/2018 | Lin |
| 9,939,589 B2 | 4/2018 | Takano |
| 9,977,199 B2 | 4/2018 | Takano |
| 2001/0010741 A1 | 8/2001 | Hizuka |
| 2002/0191919 A1 | 12/2002 | Nolan |
| 2003/0007739 A1 | 1/2003 | Perry |
| 2003/0053787 A1 | 3/2003 | Lee |
| 2003/0063867 A1 | 4/2003 | McDonald |
| 2003/0147598 A1 | 8/2003 | McPhee |
| 2003/0156796 A1 | 8/2003 | Rathnam |
| 2003/0161586 A1 | 8/2003 | Hirabayashi |
| 2004/0047566 A1 | 3/2004 | McDonald |
| 2004/0052473 A1 | 3/2004 | Seo |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2005/0111796 A1 | 5/2005 | Matasek |
| 2005/0141817 A1 | 6/2005 | Yazaki |
| 2005/0213897 A1 | 9/2005 | Palmer |
| 2006/0089049 A1 | 4/2006 | Sedor |
| 2006/0127025 A1 | 6/2006 | Haberman |
| 2006/0269194 A1 | 11/2006 | Luther |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0026647 A1 | 1/2008 | Boehnlein |
| 2008/0044137 A1 | 2/2008 | Luther |
| 2008/0069501 A1 | 3/2008 | Mudd |

(56) References Cited

U.S. PATENT DOCUMENTS

| | | |
|---|---|---|
| 2008/0101757 A1 | 5/2008 | Lin |
| 2008/0226237 A1 | 9/2008 | O'Riorden |
| 2008/0267566 A1 | 10/2008 | En Lin |
| 2009/0022457 A1 | 1/2009 | de Jong |
| 2009/0028507 A1 | 1/2009 | Jones |
| 2009/0148101 A1 | 6/2009 | Lu |
| 2009/0196555 A1 | 8/2009 | Lin |
| 2009/0214162 A1 | 8/2009 | O'Riorden |
| 2009/0220197 A1 | 9/2009 | Gniadek |
| 2009/0226140 A1 | 9/2009 | Belenkiy |
| 2009/0269014 A1 | 10/2009 | Winberg |
| 2010/0034502 A1 | 2/2010 | Lu |
| 2010/0092136 A1 | 4/2010 | Nhep |
| 2010/0129031 A1 | 5/2010 | Danley |
| 2010/0215322 A1 | 8/2010 | Matsumoto |
| 2010/0247041 A1 | 9/2010 | Szilagyi |
| 2010/0322561 A1 | 12/2010 | Lin |
| 2011/0044588 A1 | 2/2011 | Larson |
| 2011/0081119 A1 | 4/2011 | Togami |
| 2011/0131801 A1 | 6/2011 | Nelson |
| 2011/0177710 A1 | 7/2011 | Tobey |
| 2012/0025209 A1* | 2/2012 | Kim .............. G02B 6/3882 257/81 |
| 2012/0099822 A1 | 4/2012 | Kuffel |
| 2012/0128305 A1 | 5/2012 | Cooke |
| 2012/0189260 A1 | 7/2012 | Kowalczyk |
| 2012/0269485 A1 | 10/2012 | Haley |
| 2012/0301080 A1 | 11/2012 | Gniadek |
| 2013/0071067 A1 | 3/2013 | Lin |
| 2013/0089995 A1 | 4/2013 | Gniadek |
| 2013/0094816 A1 | 4/2013 | Lin |
| 2013/0121653 A1 | 7/2013 | Ott |
| 2013/0183012 A1 | 7/2013 | Cabanne |
| 2013/0216185 A1 | 8/2013 | Klavuhn |
| 2013/0315539 A1* | 11/2013 | Koreeda ............. G02B 6/3849 385/69 |
| 2013/0322825 A1 | 12/2013 | Cooke |
| 2014/0016901 A1 | 1/2014 | Lambourn |
| 2014/0023322 A1 | 1/2014 | Gniadek |
| 2014/0050446 A1 | 2/2014 | Chang |
| 2014/0133808 A1 | 5/2014 | Hill |
| 2014/0334780 A1 | 11/2014 | Nguyen |
| 2014/0348477 A1 | 11/2014 | Chang |
| 2015/0023646 A1 | 1/2015 | Belenkiy |
| 2015/0078717 A1 | 3/2015 | Lin |
| 2015/0117467 A1 | 4/2015 | Leung |
| 2015/0168655 A1* | 6/2015 | Isenhour ............. G02B 6/3885 385/75 |
| 2015/0241642 A1 | 8/2015 | Hikosaka |
| 2015/0355417 A1 | 12/2015 | Takano |
| 2015/0378113 A1 | 12/2015 | Good |
| 2016/0041349 A1 | 2/2016 | Pimpinella |
| 2016/0085045 A1* | 3/2016 | Hill ..................... G02B 6/3849 385/78 |
| 2016/0259135 A1 | 9/2016 | Gniadek |
| 2017/0091671 A1 | 3/2017 | Mitarai |
| 2017/0254966 A1 | 9/2017 | Gniadek |
| 2018/0011261 A1 | 1/2018 | Hill |

FOREIGN PATENT DOCUMENTS

| | | |
|---|---|---|
| CN | 201383588 Y | 1/2010 |
| DE | 19901473 A1 | 7/2000 |
| DE | 202006011910 U1 | 4/2007 |
| DE | 102006019335 A1 | 10/2007 |
| EP | 1072915 A2 | 1/2001 |
| EP | 1074868 A1 | 2/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001079904 A2 | 10/2001 |
| WO | 2004027485 A1 | 4/2004 |
| WO | 2008112986 A1 | 9/2008 |
| WO | 2009135787 A1 | 11/2009 |
| WO | 2010024851 A2 | 3/2010 |
| WO | 2012136702 A1 | 10/2012 |
| WO | 2012162385 A1 | 11/2012 |
| WO | 2013052070 A1 | 4/2013 |
| WO | 2013179197 A1 | 12/2013 |
| WO | 2014028527 A2 | 2/2014 |
| WO | 2014182351 A1 | 11/2014 |

* cited by examiner

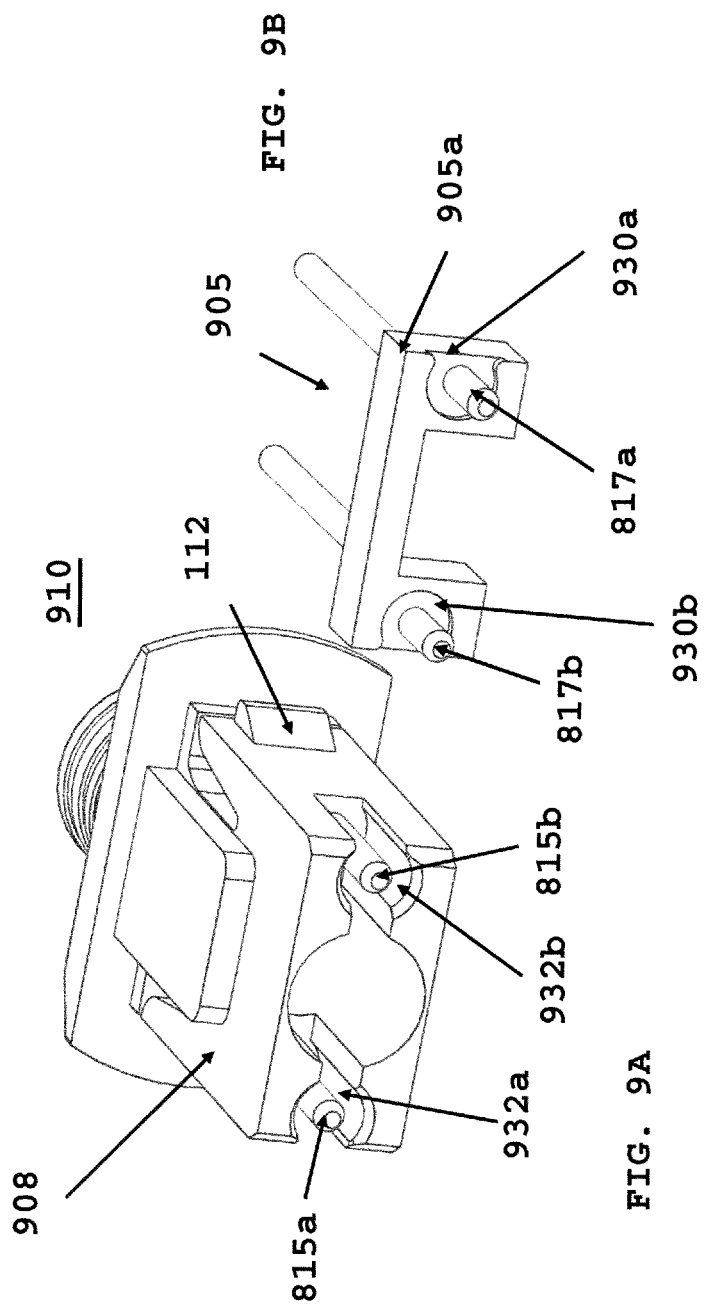

DUAL SPRING MULTI-FIBER OPTIC CONNECTOR

CROSS-REFERENCES TO RELATED APPLICATIONS

This application claims priority to U.S. Provisional Application No. 62/682,012 filed on Jun. 7, 2018, which is incorporated herein by reference in its entirety.

FIELD OF THE INVENTION

The present invention relates to fiber optic connectors, and more particularly, to fiber optic connectors with a dual spring assembly for improving assembly and reducing manufacturing cost.

BACKGROUND OF THE INVENTION

Modern high capacity optical systems often utilize fiber optic ribbons for inter-system connection. As there are multiple connection points in an optical path, and a spring is typically required to bias forward a ferrule assembly, there is a need to simplify assembly of the fiber optic strands or cable containing multiple strands by removing the single spring.

SUMMARY OF THE INVENTION

According to the present invention, a fiber optic connector comprises a ferrule housing with at least one ferrule and at least one fiber optic strand. In a traditional MPO fiber connector, as shown in FIG. 1, a single spring is configured to encircle a fiber optic cable with one or more fiber strands. In the present invention, the ferrule housing is configured to accept two springs preferably positioned on either side of the fiber optic strand or strands.

In a traditional process, after a curing step is complete to attached fiber optic cable or strands to a ferrule housing, a spring is installed around the cable or fiber bundle. A disadvantage is this spring rattles when the connector is used, and can result in displacing the ribbon. As the spring rattles it can become lose resulting in connector failure. The spring can become offset for example. Also, the MPO ferrule assembly, backpost and pinkeep are separate parts that due to tolerance and assembly difficulties (due to size), interfere with a smooth push/pull operation of a standard MPO connector.

In the present invention, a backpost further comprises one or more pins configure to retain a spring on the side of a fiber bundle. A corresponding pin opposing and in line with a first pin on the back post, accepts a second end of the spring. During operation, the MPO connector outer housing is urged forward at a distal end (away from the ferrules). This compresses the one or more springs, and a latch attached to the outer housing mates with corresponding adapter structure to secure MPO connector therein. The spring biases connector outer housing in a distal direction holding MPO connector within said adapter.

In a second embodiment, distal pins on ferrule assembly are integrated to said ferrule outer housing. At a second end, a latch is formed within pin lead that catches in a recess formed a proximal end of an outer latch, which secures the MPO connector to the adapter as described above. Further in all embodiments, outer housing springs (725a, 725b) are replaced by a single spring reducing connector material and assembly cost, while reducing size.

BRIEF DESCRIPTION OF THE DRAWINGS

Embodiments of the invention are described in more detail hereinafter with reference to the drawings, in which:

FIG. 9A depicts a perspective view of a backbody according to an embodiment of the present invention;

FIG. 9B depicts a perspective view of a pinkeep according to an embodiment of the present invention.

DETAILED DESCRIPTION

In the following description, apparatuses for assembling a MPO connector and latching the same to a fiber optic adapter is disclosed. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
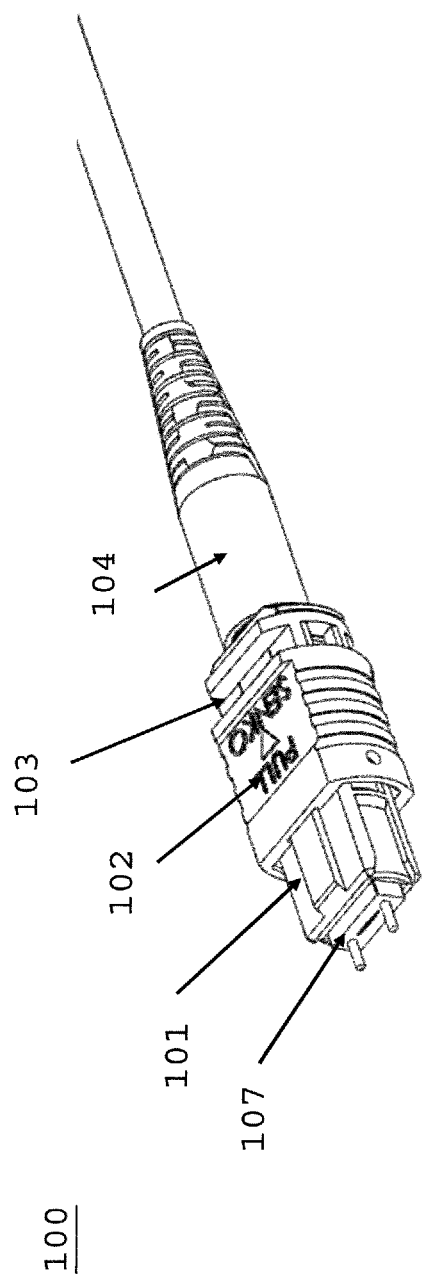
FIG. 1 depicts a multi-fiber push on/push off fiber optic connector according to a first embodiment of the present invention.

FIG. 1 depicts MPO or multi-fiber push on/push-off fiber optic connector assembled according to the present invention. Connector 100 comprising ferrule assembly 107 with one or more ferrule openings, pair of pins extending from pinkeep 105, inner housing 101 configured to hold assembly 108, and outer housing 102 that slides over inner housing 101. Raised edge 103 stops the forward movement of outer housing 102 and a cable assembly with boot 104 attaches a fiber bundle having one or more fiber optic strands.

Figure 2:
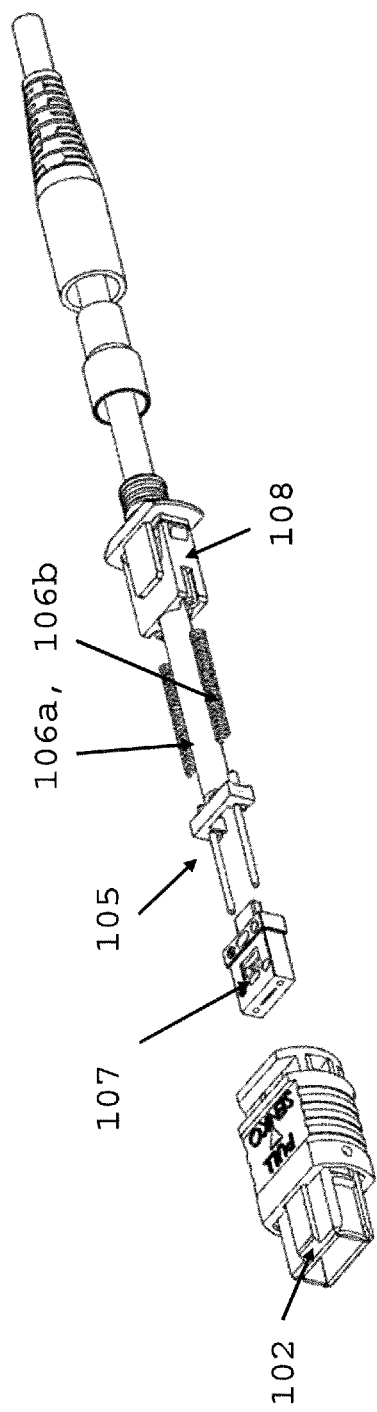
FIG. 2 depicts an exploded view of the connector of FIG. 1.

FIG. 2 depicts an exploded view of FIG. 1. Outer housing 102 accepts ferrule assembly 107. Pinkeep 105 is received within distal end of assembly 107. Pinkeep 105 has a pair of opposing posts or pins that receive a spring (106a, 106b), and backbody 108 receives an opposing end of springs (106a, 106b). Backbody 108 openings receiving springs 106 and opposing posts retain the springs on opposing sides of a fiber bundle, and reducing spring rattle.

Figure 3:
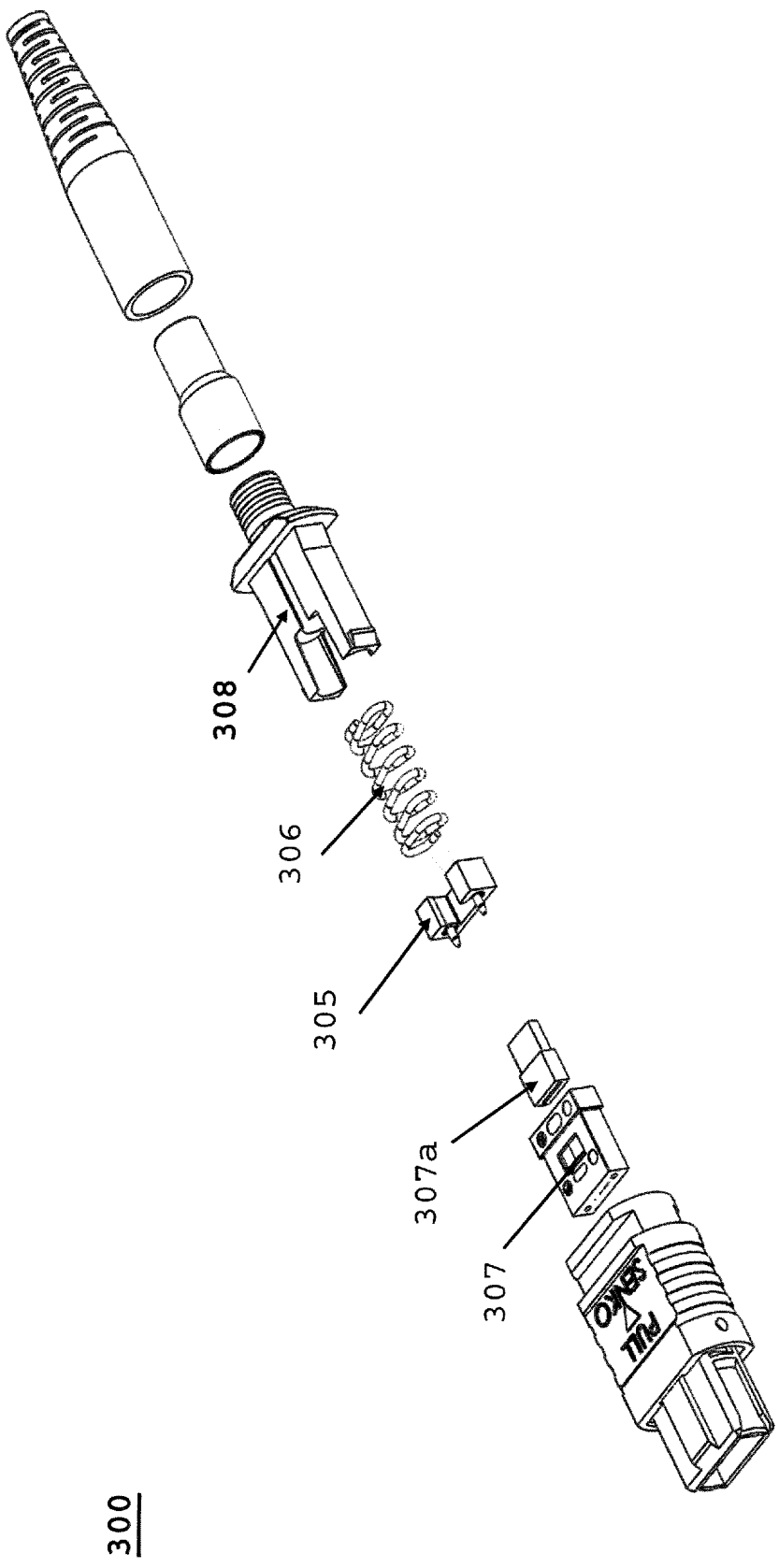
FIG. 3 is a standard MPO connector.

FIG. 3 depicts an exploded view of standard MPO connector 300. Ferrule assembly 307 receives ferrule alignment key 307a that is received in pinkeep 305. A single spring 306 is pressed against the distal end of pinkeep 305 by backbody 308.

Figure 4A:
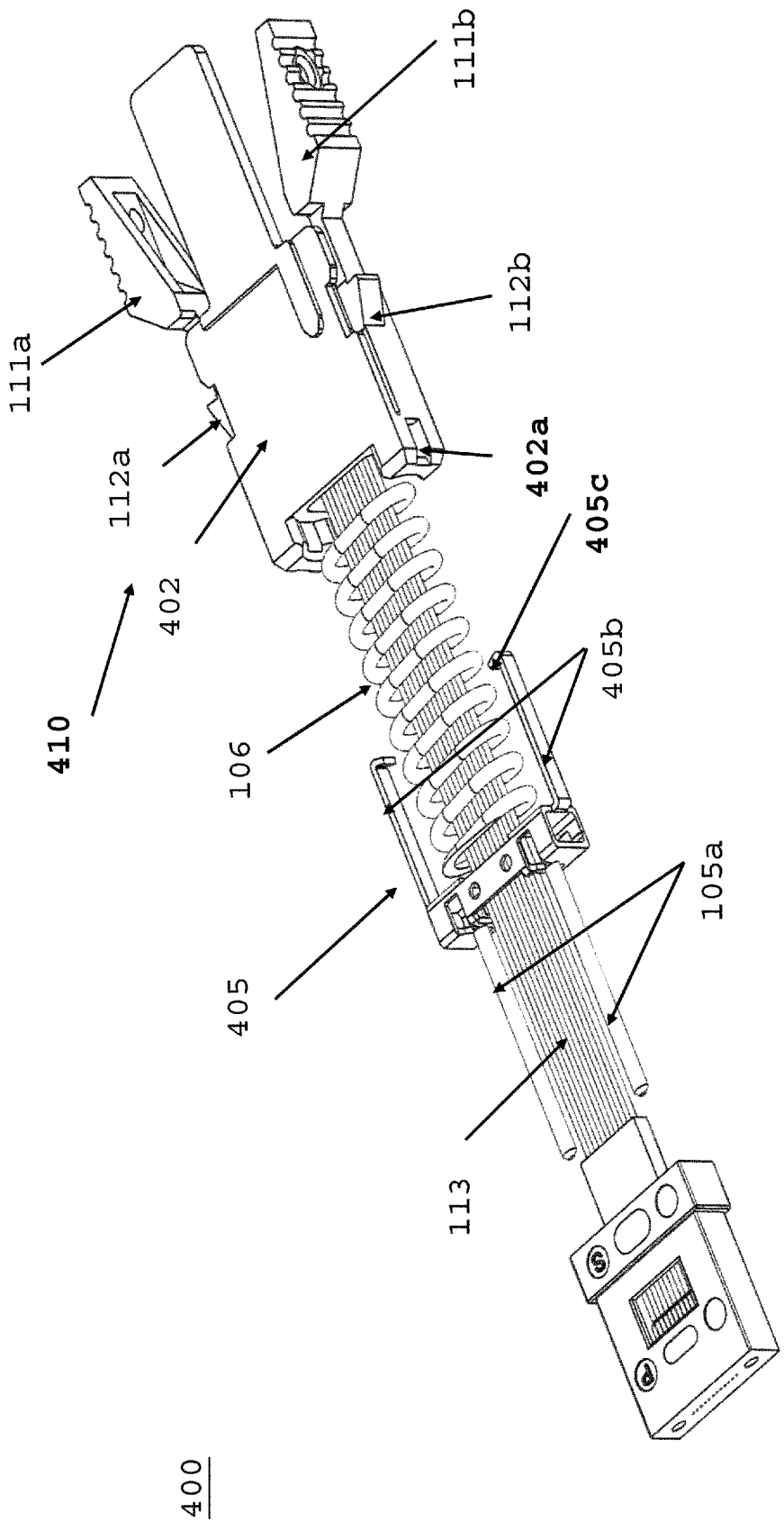
FIG. 4A depicts an alternate latch embodiment of a standard MPO connector.

FIG. 4A depicts MPO connector 400 according to an embodiment of the present invention. Pinkeep 405 with extended arms 405b, arms configured with reverse bend 405c, are accepted into recess 402a of outer housing 402. Outer housing a pair of opposing protrusions (112a, 112b) that when depressed inward by pair of latches (111a, 111b), the protrusions are captured in a corresponding cutout within an adapter outer housing (not shown). Pair of pins 105a protrude from pinkeep 405 at a proximal end thereof.

Figure 4B:
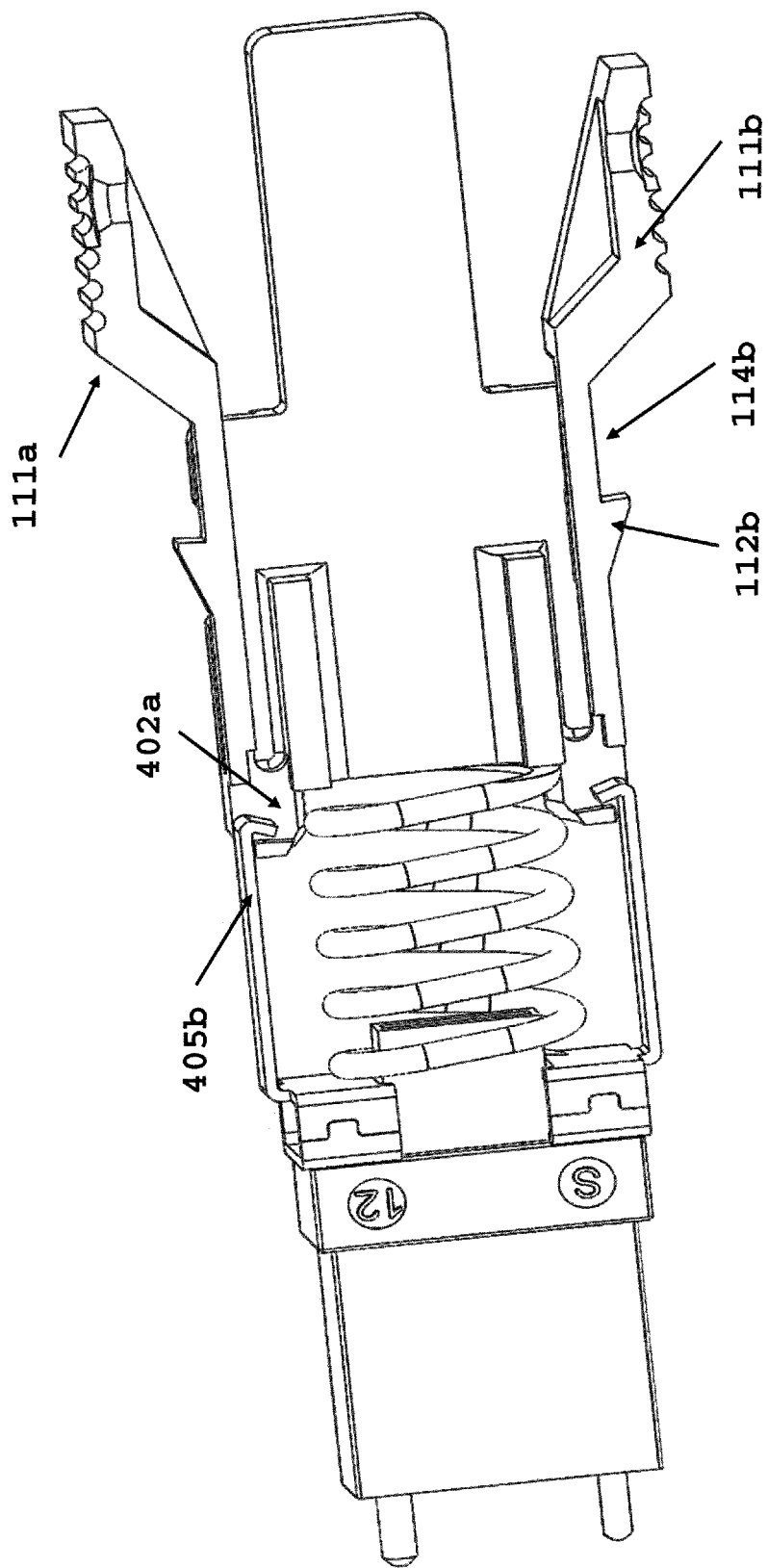
FIG. 4B depicts a side cross-section view of FIG. 4A.
Figure 4C:
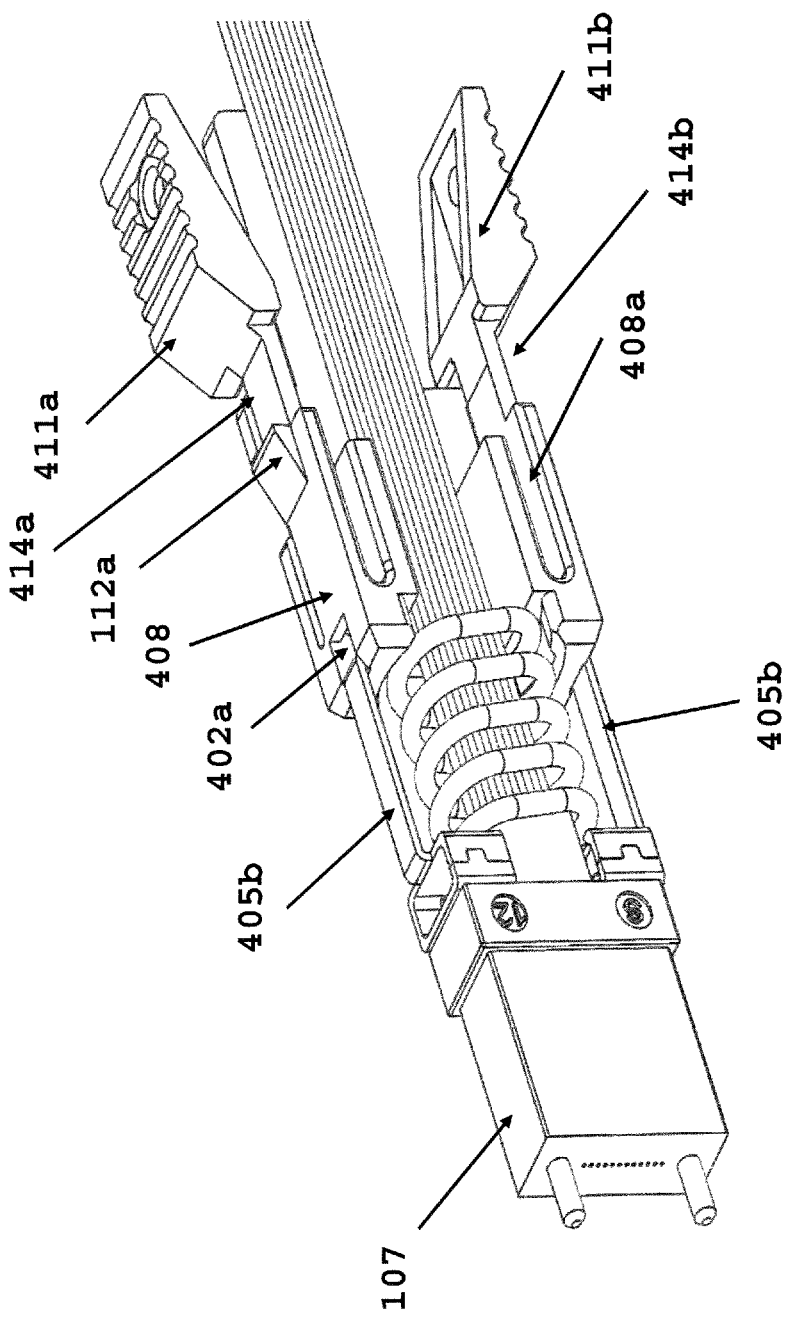
FIG. 4C depicts a perspective view of FIG. 4B.

FIG. 4B depicts a cross-section side view of FIG. 4A. Recess 402a is disclosed with extended arms 405b (formed as part of) pinkeep secured therein to assemble ferrule to backbody. Protrusion 112b and latch 111b form recess 114b that secures connector to corresponding adapter structure. In FIG. 4B, like elements of FIGS. 1-3 are also disclosed. FIG. 4C depicts a partial cross-section view of FIG. 4A, with backbody 408 integrated with a pair of depressable latches (411a, 411b) that when depressed, latch body retreats into clearance area 408a. This clearance area 408a allows protrusion 112a (112b not shown) to clear an inner wall of an outer housing an adapter, so said protrusion can be secured within cutout of adapter wall thereby securing said MPO connector therein. Recess (414a, 414b) is formed between protrusion (112a, 112b) and latch (411a, 411b).

Figure 5:
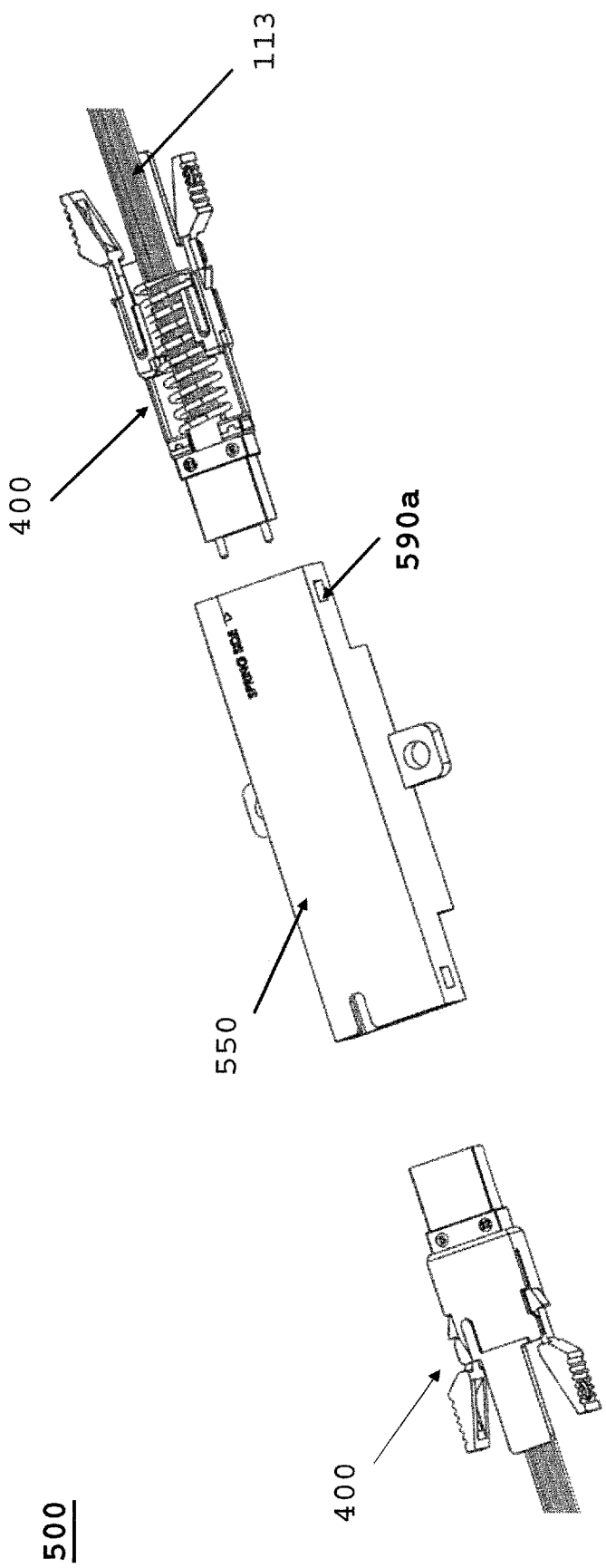
FIG. 5 is an exploded view of the MPO connector of FIG. 4A prior to insertion into an adapter.
Figure 6:
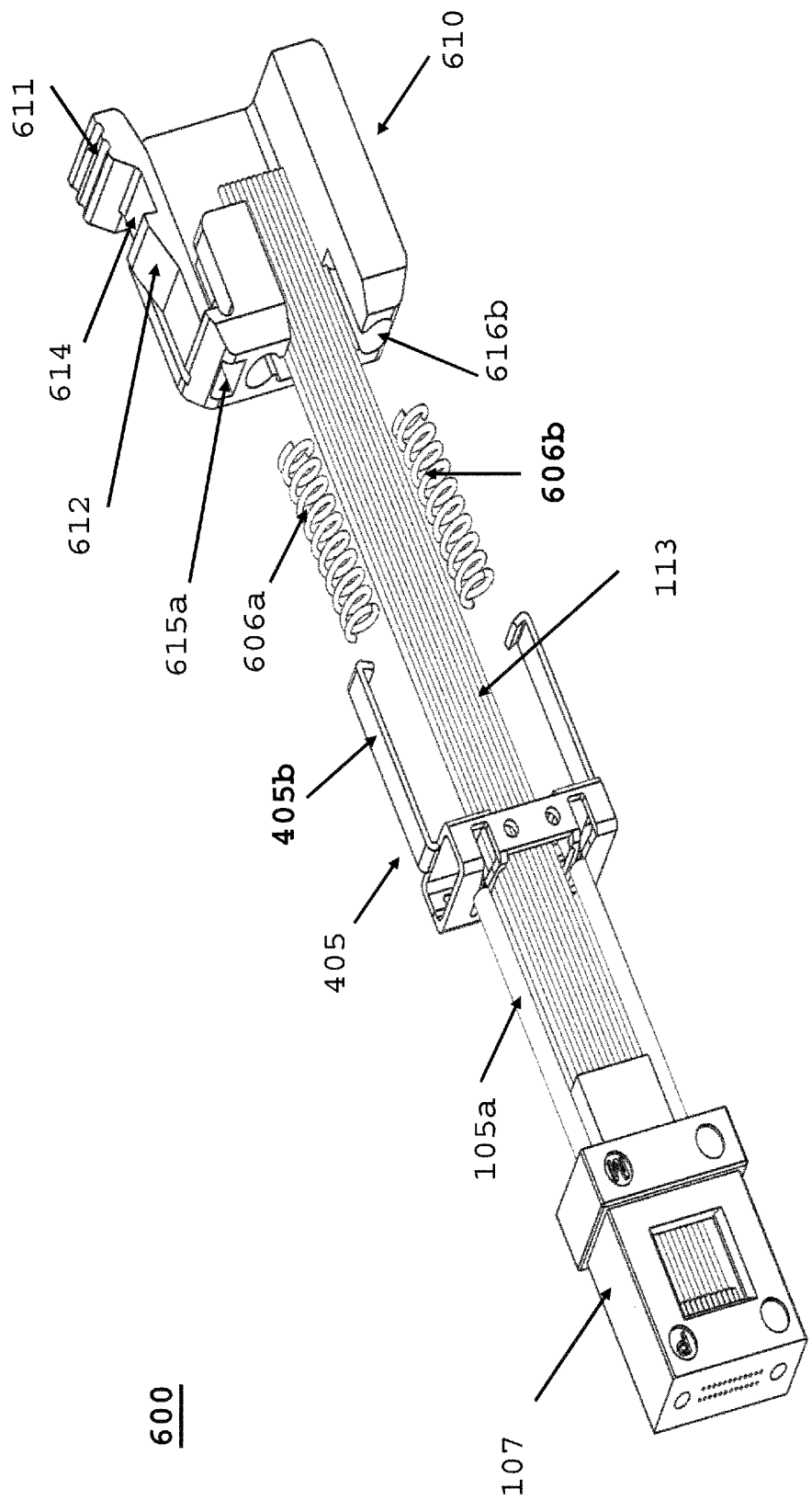
FIG. 6 is the MPO connector of FIG. 4 according to a second embodiment of the present invention.

FIG. 5 depicts a fiber optic adapter 550 configure to accept a MPO connector 400 at either end. Cutout 590a accepts protrusion 112a. FIG. 6 is an exploded view of connector 400 with a second backbody embodiment. The extended arms 405b are accepted into openings (615a, 615b (latter not shown)) of outer housing/back body/latch combination 610 (or 410 of FIG. 4A). A corresponding spring 606a, 606b) is received in opening 616b for spring 606b, to secure said spring from rattling. Spring rattling increases connector failure during use. Latch 611 used to secure MPO connector to an adapter (not shown) further comprises recess 614 that accepts adapter structure to secure connector within adapter, and protrusion 612 that forms recess 614 with latch 611.

Figure 7:
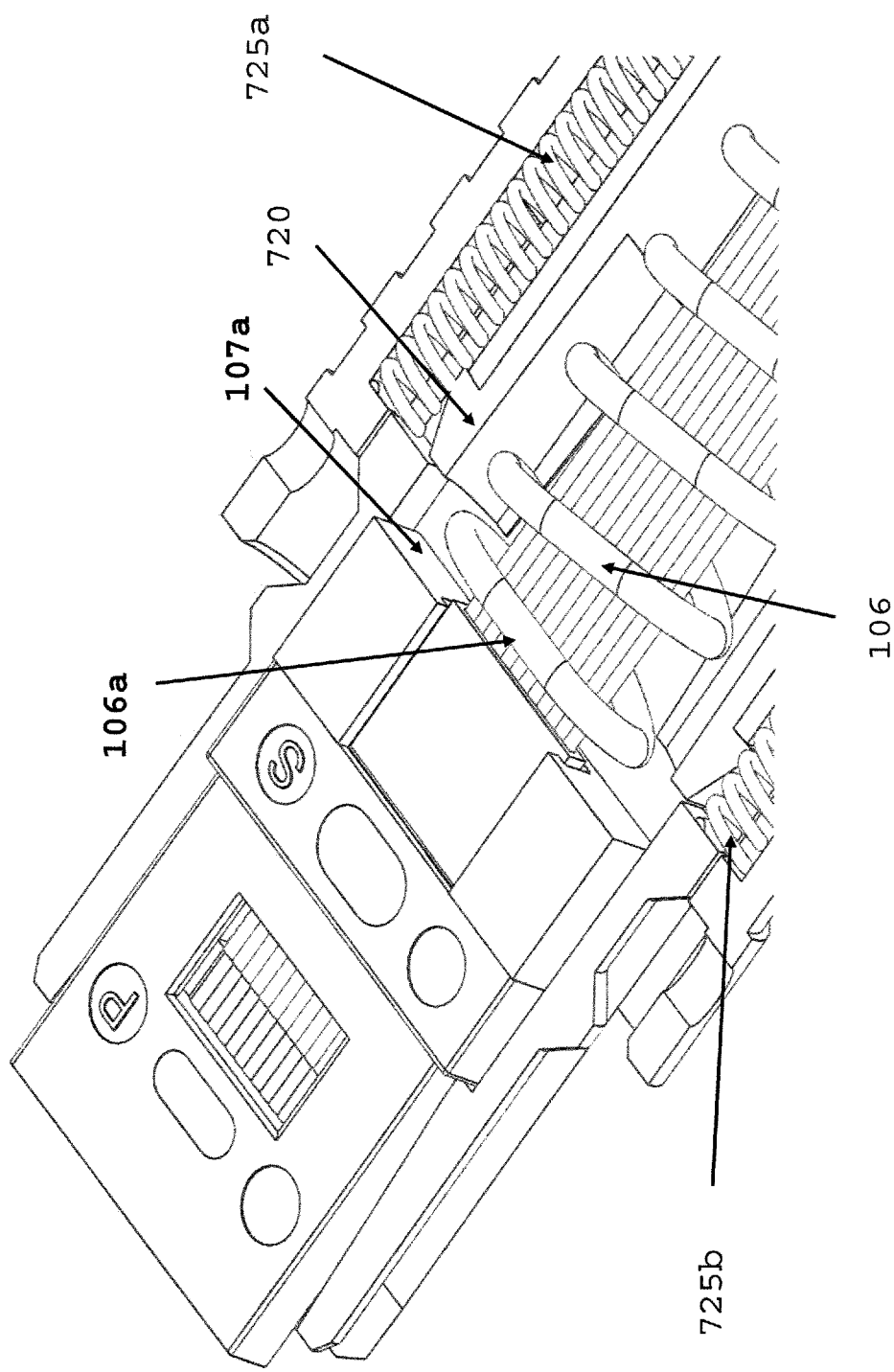
FIG. 7 depicts an outer housing latching to inner housing of a standard MPO connector with the dual spring embodiment.

FIG. 7 depicts a front portion of a standard MPO connector. A pair of outer housing springs (725a, 725b) are not found in connector 400 (refer to FIG. 4A). Ferrule bias spring 106 is positioned around fiber optic cable bundle 113, which increase assembly cost and connector failure due to spring rattle. Unlike the present invention, proximal end of spring 106 seats up against distal end 107a of ferrule assembly 107, were the spring rattle loosens fiber cable assembly that is glued into distal end of ferrule assembly. Back stopper 720 (refer to FIG. 7) can help retain spring 106 from moving, but suffers from only supporting one end of the spring. By contrast, in the present invention both ends of the dual spring is supported from movement.

Figure 8:
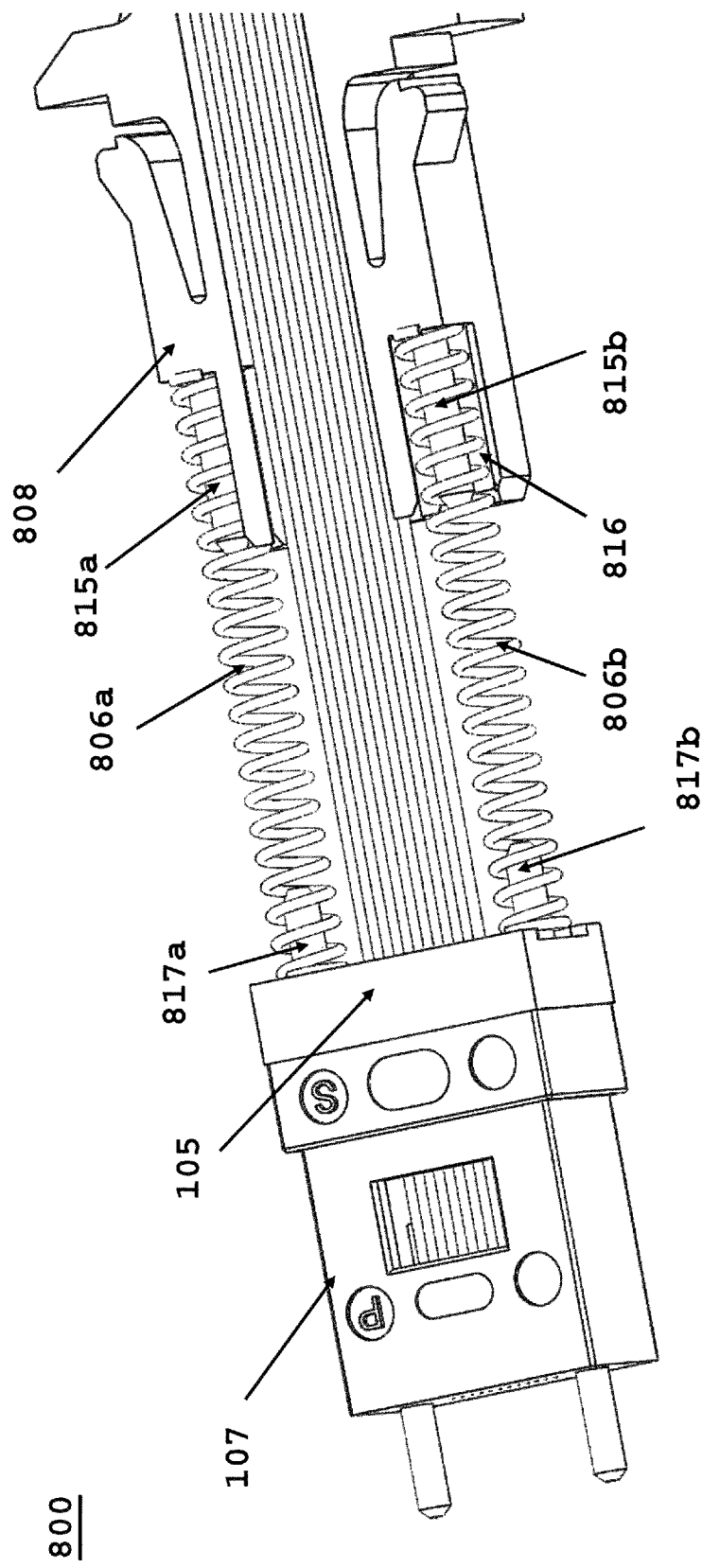
FIG. 8 depicts another embodiment of MPO connector according to the present invention.

FIG. 8 depicts a MPO connector 800 according to another embodiment of the present invention. Backbody 808 has pair of opposing pins (815a, 815b) that accept distal end of springs (806a, 806b) respectively to reduce spring rattle. Pins 815 are contained within a corresponding recess 816 that further reduces spring rattle, at one end of the spring. At a proximal end of spring (806a, 806b), with proximal end defined near ferrule assembly 107, pair of opposing pins (817a, 817b) to distal pins (815a, 815b), accept a first end of corresponding spring (806a, 806b). Pins (817a, 817b) are integrated with ferrule assembly at a distal end thereof. Pins (817a, 817b) further reduce spring rattle.

FIG. 9A depicts backbody 908 with pinkeep 105 formed of pins (815a, 815b) and backbody 908 and latch 112 resulting in assembly combination 910. Pins (815a, 815b) accept springs (806a, 806b) at a second end or distal end, within corresponding recess (932a, 932b) formed within backbody about pins (815a, 815b) respectively. FIG. 9B depicts a second embodiment of pins (817a, 817b) that extend from an opposite end of pinkeep 905, and corresponding recesses (930a, 930b) formed within pinkeep body 905a that accepts a second end or distal end of corresponding springs (806a, 806b). FIGS. 9A and 9B discloses pins with a recess at a first end where the pins are secured as part of the pinkeep. The pins are configured to accept the springs, and the springs at a first end rest within the recess formed as part of the pinkeep or pinkeep as part of backbody. The pins and recesses help reduce rattle that can lead to ferrule assembly displacement and signal loss. In FIG. 9A, recess (932a, 932b) extends beyond pins (815a, 815b). In FIG. 9B, recess (930a, 930b) is within pinkeep 905 body or extends into pinkeep 905.

An ordinarily skilled person in the art can appreciate that by following the principal of the present invention, a version of the adapter for mating a multi-fiber optic ferrule connector with another multi-fiber optic ferrule connector can be derived without departing from the scope and spirit of the invention. Although the embodiments of the present invention described herein are related to multi-fiber optic applications, the present invention can be adapted to single fiber optic applications. Specific details may be omitted so as not to obscure the invention; however, the disclosure is written to enable one skilled in the art to practice the teachings herein without undue experimentation.

The foregoing description of the present invention has been provided for the purposes of illustration and description. It is not intended to be exhaustive or to limit the invention to the precise forms disclosed. Many modifications and variations will be apparent to the practitioner skilled in the art.

What is claimed is:

1. A fiber optic connector having a longitudinal axis and configured to be connected to another optical component by insertion in a forward direction along the longitudinal axis, comprising:
    a pinkeep having a first side portion that defines a face and first and second pins projecting along the longitudinal axis relative to the face of the first side portion;
    a first recess formed into the first side portion, the first recess extending from the face in the forward direction and extending around the first pin such that the first side portion comprises material defining the face and the first recess and extending from the face in the forward direction along the longitudinal axis on opposing sides of the first pin;
    a second recess formed into the first side portion, the second recess extending from the face in the forward direction and extending around the second pin such that the first side portion comprises material defining the face and the second recess and extending from the face in the forward direction along the longitudinal axis on opposing sides of the second pin;
    a first spring having a first end portion received in the first recess, the first pin being received within the first spring, and
    a second spring having a first end portion received in the second recess, the second pin being received within the second spring;
    wherein the first and second springs bias a ferrule assembly forward and further wherein the first and second springs stabilize the ferrule assembly.

2. The fiber optic connector according to claim 1, wherein the pinkeep further comprises a pair of extended arms, with a bend at a first end of each arm.

3. The fiber optic connector according to claim 2, further comprising a back body that accepts the extended arms at the first end, and the extended arms at a second end are secured to a distal end of the ferrule assembly.

4. The fiber optic connector according to claim 1, further comprising a backbody separate from the pinkeep.

5. The fiber optic connector according to claim 4, wherein the pinkeep is coupled to the ferrule assembly.

6. The fiber optic connector according to claim 5, further comprising a second set of pins is formed as part of the backbody.

7. The fiber optic connector according to claim 6, further comprising one or more recesses formed as part of the backbody.

\* \* \* \* \*